(12) United States Patent
Tanaka et al.

(10) Patent No.: US 7,374,346 B2
(45) Date of Patent: May 20, 2008

(54) FIBER STUB WITH OPTICAL ELEMENT, OPTICAL RECEPTACLE AND OPTICAL MODULE

(75) Inventors: Tsuyoshi Tanaka, Kitami (JP);
Tomoyuki Hirose, Kitami (JP);
Kaichiro Nakashima, Kitami (JP);
Michifumi Shoda, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/046,551

(22) Filed: Jan. 28, 2005

(65) Prior Publication Data

US 2005/0207710 A1   Sep. 22, 2005

(30) Foreign Application Priority Data

Jan. 29, 2004   (JP) ............... P 2004-021950

(51) Int. Cl.
*G02B 6/26* (2006.01)
*G02B 6/42* (2006.01)

(52) U.S. Cl. ..................................... 385/88; 385/47

(58) Field of Classification Search .......... 385/47, 385/88
See application file for complete search history.

(56) References Cited

U.S. PATENT DOCUMENTS 5,859,944 A * 1/1999 Inoue et al. ............... 385/73
6,577,779 B2   6/2003 Watanabe
6,953,288 B2 * 10/2005 Foley et al. ............... 385/92
2004/0076384 A1 * 4/2004 Kato et al. ................ 385/92

FOREIGN PATENT DOCUMENTS

| JP | 10-062652 | 3/1998 |
| JP | 10-133146 | 5/1998 |
| JP | 2000-162475 | 6/2000 |
| JP | 2002-158389 | 5/2002 |
| JP | 2003-167218 | 6/2003 |

* cited by examiner

*Primary Examiner*—Sung Pak
*Assistant Examiner*—Jerry T. Rahll
(74) *Attorney, Agent, or Firm*—Hogan & Hartson LLP (57) ABSTRACT

In a semiconductor laser module with an optical isolator where the form of a metal holder for holding a fiber stub varies, optical-isolator parts are miniaturized and unified, simplifying product management, reducing delivery time and cost. A fiber stub with an optical isolator is provided in such a manner that a stepped surface is formed on an end surface of a ferrule, where an optical fiber has been inserted and secured to a through hole formed at the center of the ferrule. The fiber stub is formed by attaching an optical isolator element composed of a polarizer and a Faraday rotator to the stepped surface.

15 Claims, 9 Drawing Sheets

FIBER STUB WITH OPTICAL ELEMENT, OPTICAL RECEPTACLE AND OPTICAL MODULE

BACKGROUND OF THE INVENTION

1. Field of the Invention

The present invention relates to a fiber stub in which an optical element such as an optical isolator is mounted, an optical receptacle and an optical module.

2. Description of the Related Art

Figure 8:
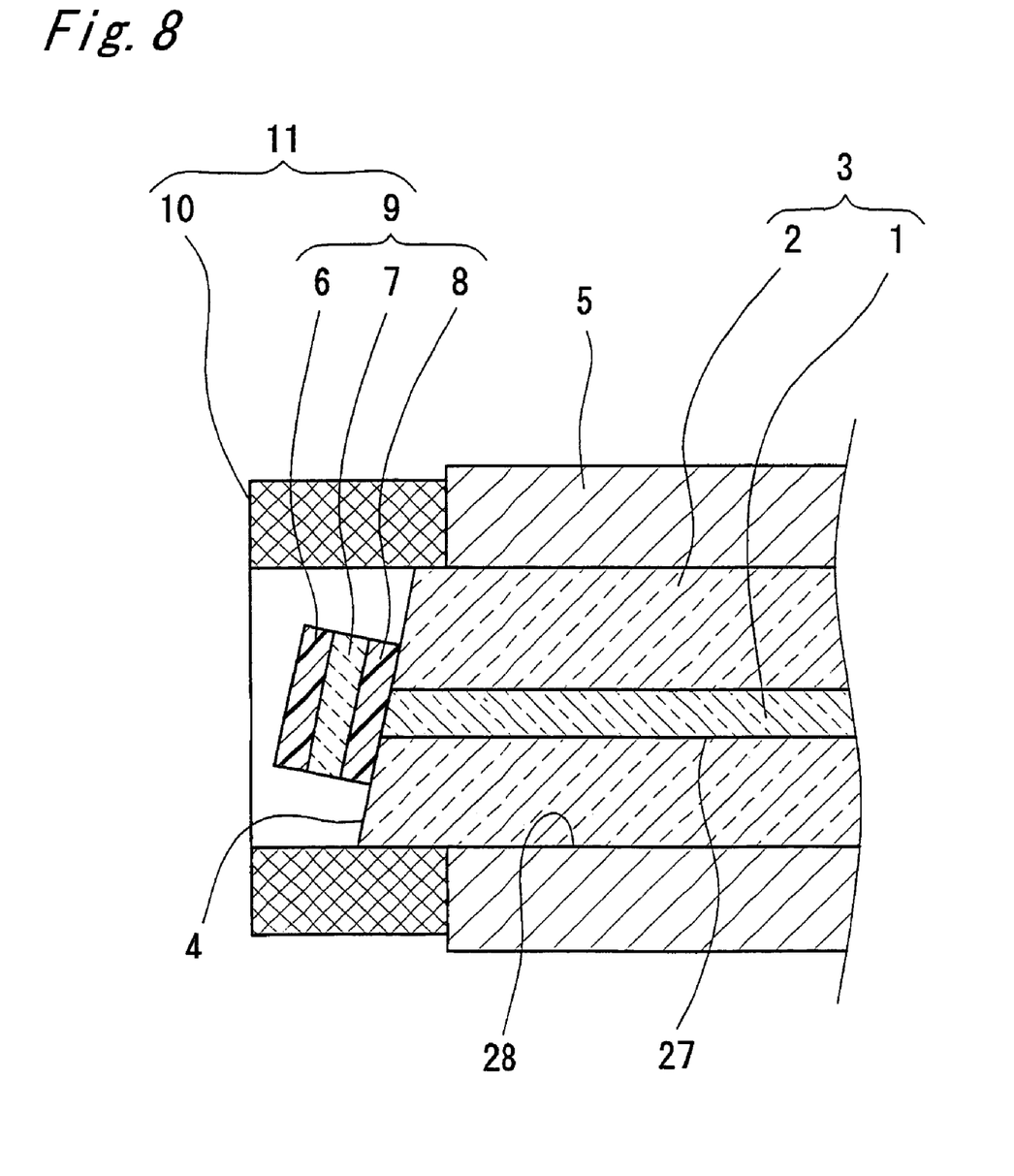
FIG. 8 is a longitudinal cross-sectional diagram showing the main portion of a conventional fiber stub with an optical isolator.
Figure 9:
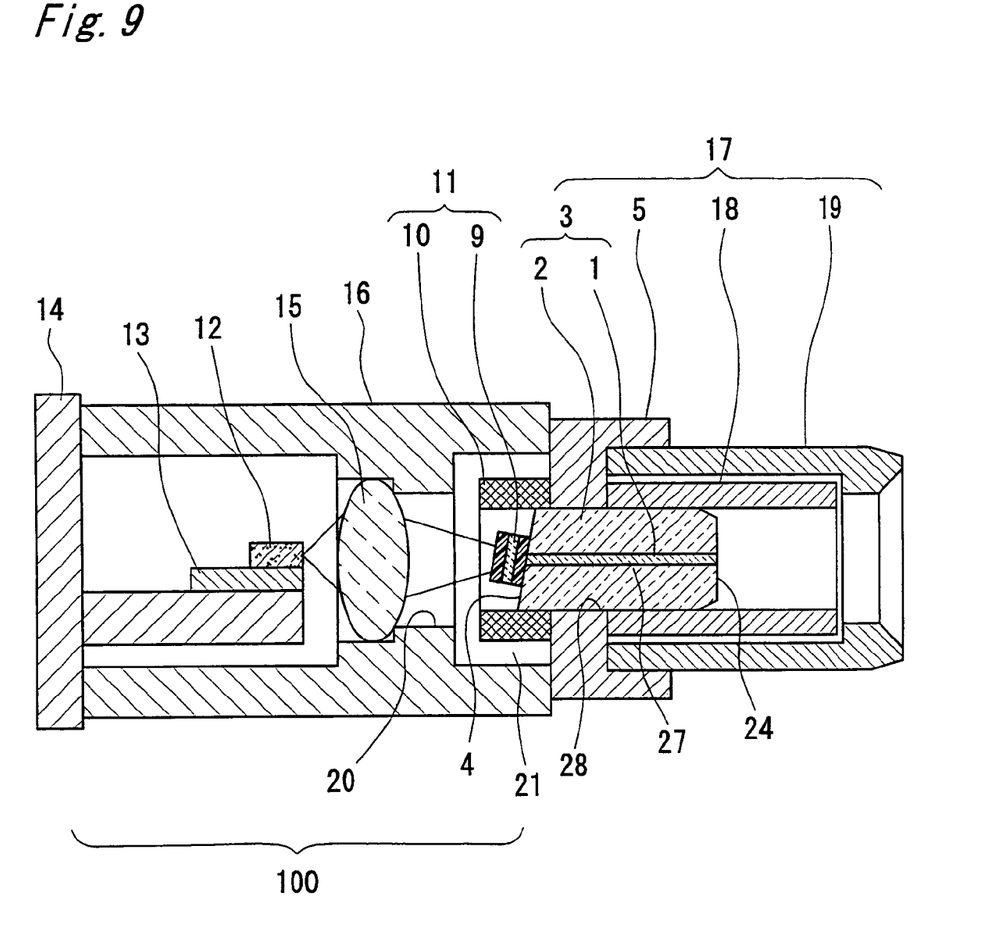
FIG. 9 is a longitudinal cross-sectional diagram of a conventional semiconductor laser module along the center thereof.

An optical element such as an optical isolator for preventing reflected light from returning is generally incorporated into compact semiconductor laser modules which are mounted with high density in an optical transceiver that is utilized for optical communication. For example, Patent Document 1 and Patent Document 2 disclose a conventional fiber stub with an optical isolator, as well as an optical receptacle and an optical module which use such a fiber stub. The internal structures of these are described in reference to FIGS. 8 and 9. FIG. 8 is a longitudinal cross-sectional diagram of the main portion of a conventional fiber stub with an optical isolator. FIG. 9 is a longitudinal cross-sectional diagram of an optical module that uses the fiber stub with an optical isolator of FIG. 8.

The optical module shown in FIG. 9 is a coaxial semiconductor laser module in the case where an end portion of the optical fiber is of an optical-receptacle type. In FIG. 9, a PD (photo diode) for monitoring and lead wires for wiring the PD are omitted. This optical module is formed of an optical unit 100, which is made up of a semiconductor laser 12, a heat sink 13, a metal stem 14, a lens 15 and a lens holder 16; an optical isolator 11; and an optical receptacle 17.

In the optical unit 100, the semiconductor laser 12 is mounted on the heat sink 13 by means of soldering. The heat sink 13 is also secured onto the metal stem 14 by means of soldering. The lens holder 16 made of metal is resistance welded onto the metal stem 14. The lens 15 is secured to the inside of the lens holder 16 by means of low melting point glass or the like.

An optical fiber 1 is secured, by means of an adhesive, in a ferrule 2 made of ceramic or glass material which has a through hole 27 in the center. A fiber stub 3 is composed of the optical fiber 1 and the ferrule 2. An end of the fiber stub 3 is inserted into and secured to a through hole 28 of a metal holder 5. An end surface 4 of the fiber stub 3 is polished to incline by 8° in order to suppress light return to an optical element 12, such as a semiconductor laser, due to a near end reflection.

In order to prevent the light return to the optical element 12 more efficiently, an optical isolator element 9 is secured to the end surface of the fiber stub 3. The optical isolator element 9 is composed of a polarizer 6, a Faraday rotator 7 and an analyzer 8, which are attached to each other by means of an adhesive so that the transmitting polarization plane of the polarizer 6 and that of the analyzer 8 cross each other by an angle of 45°. In addition, the optical isolator element 9 has been cut out so as to be placed inside of the outer diameter of the end surface 4 of the fiber stub 3, and is secured to the end surface 4 of the fiber stub 3 by means of adhesion. The optical isolator element 9 is mounted and secured so that the transmitting polarization plane of the polarizer 6 becomes perpendicular or lateral in relative to the direction of the maximum inclination of the end surface 4 (the surface polished to incline by 8°) of the fiber stub 3.

A cylindrical magnet 10 applies a magnetic field to the Faraday rotator 7 in the optical isolator element 9. The magnet 10 is secured to metal holder 5 by means of adhesion so that the end of fiber stub 3 can be inserted into the inside thereof. The optical isolator 11 is composed of the optical isolator element 9 and the magnet 10.

Meanwhile, a rear end surface 24 of the fiber stub 3 is polished to have a curved surface so as to be fitted with the end of the plug ferrule of an optical connector, which is not shown in the drawing. The rear end side of the fiber stub 3 is covered with a sleeve 18 that is in hollow cylindrical form and made of ceramic or metal. In addition, the sleeve 18 is surrounded by a shell 19. The shell 19 is made of metal, plastic or the like, and is inserted and secured to the metal holder 5. The fiber stub 3, the metal holder 5, the sleeve 18 and the shell 19 compose the optical receptacle 17.

Schematically, optical modules are assembled as follows: First, the optical unit 100 and the optical receptacle 17 to which the optical isolator 11 has been attached are prepared. Next, the position of the optical receptacle 17 relative to the optical unit 100 is adjusted so that light emitted from the semiconductor laser 12 is focused on the optical fiber 1 via the optical isolator 11 by means of the lens 15. After that, the metal holder 5 of the optical receptacle 17 is secured to the lens holder 16 by means of laser welding or the like. Here, a counterbore portion 21 is created inside the lens holder 16 within the optical unit 100 so as to provide a space which is large enough for the optical isolator 11 not to make contact with the inner wall of the lens holder 16 at the time when the position of the optical receptacle 17 is adjusted.

[Patent Document 1] Japanese Unexamined Patent Publication No. 2000-162475

[Patent Document 2] Japanese Unexamined Patent Publication No. 2002-158389

SUMMARY OF THE INVENTION

When an optical element 9 such as an optical isolator element or a Faraday rotator mirror is secured to the end surface 4 of the fiber stub 3 by means of adhesion, the optical element 9 must be placed so that the optical surface of the optical element 9 covers an end surface of the optical fiber 1. In the conventional structure shown in FIGS. 8 and 9, however, the area of the end surface 4 tends to become far larger than the optical element 9, particularly in the case where the optical element 9 is miniaturized. In addition, no means is provided to regulate the position of the optical element 9. Therefore, when the optical element 9 is secured to the end surface 4 of the fiber stub 3 by means of an adhesive, the optical element 9 may be misaligned in some cases. If the optical element 9 is misaligned, the optical element 9 is disconnected from the end surface of the optical fiber 1, which penetrates and is secured to the through hole 27.

Therefore, a relatively large optical element 9 is required, which is secured to the end surface 4 of the fiber stub 3, taking into consideration the possible positional shift of the optical element 9 during adhesion. In the case where the diameter of the light beam propagating into the optical element 9 is approximately 0.3 mm, for example, an optical element 9 smaller than the size of length 0.45 mm×width 0.45 mm can hardly be used. This leads to an increase in the total size of the optical module.

In addition, in the case where the optical element is a conventional isolator, a magnet is required to apply a magnetic field to the optical isolator element. The conventional optical module has such a structure that the magnet 10 in cylindrical form is secured to the fiber stub 3 through insertion, and thereby attached to an end surface of the metal holder 5, and therefore, a problem arises that the outer diameter of the magnet 10 becomes large. For the purpose of downsizing the magnet 10, the inner diameter of the magnet 10 may be made smaller than the outer diameter of the fiber stub 3, while the end of the fiber stub 3 is still contained within the through hole 28 of the metal holder 5. In such a structure, however, a problem arises that the fixing strength of the magnet 10 is lowered, or the magnet 10 and the optical isolator element 9 go out of the alignment with each other.

Furthermore, it is necessary to provide in the inner portion of the lens holder 16 a counterbore portion 21 having a diameter larger than the outer diameter of the magnet 10, and deep enough for the magnet 10 not to make contact with the lens holder 16, even when the optical receptacle 17 is shifted to the front or rear at the time of optical axis adjustment. If the magnet 10 makes contact with the inside of the counterbore portion 21, the joint portion of the magnet 10 may separate. Therefore, it is necessary to create a sufficiently large counterbore portion 21, which results in increased dimensions of the lens holder 16. Thus, the size of the optical module becomes large.

In addition, in the conventional structure, fiber stub 3 must be set into the metal holder 5 before the optical isolator 11 is attached at an end of the fiber stub 3. Therefore, it is not easy to provide variation in products, and the procedure for assembly is restricted. That is to say, in order to provide a variety of products having different forms of the metal holder 5, it becomes necessary to change the forms and the sizes of the magnet 10 and the optical isolator element 9 for respective products. As a result of this, the number of parts which are different from product to product increases, making the production management extremely complicated. In addition, in the case where the specifications of the metal holder 5 are not determined, the sizes of the magnet 10 and the optical isolator element 9 are also not decided, and inspection of properties after the optical isolator 11 has been attached to the fiber stub 3 cannot be carried out. Therefore, the fiber stub 3 to which an optical isolator is attached cannot be fabricated as a semi-finished product, and the problem arises that a quick delivery is difficult.

Thus, an object of the present invention is to provide a fiber stub with an optical element, an optical receptacle and an optical module which are compact and low in cost.

Another object is to increase freedom in the procedure for the assembly of an optical receptacle with an optical isolator.

Still another object is to simplification of production management and reduction in delivery time by unifying optical isolator parts.

In view of the above described objects, a fiber stub with an optical element according to the present invention comprises a ferrule, an optical fiber that is inserted and secured to a through hole in the center of the ferrule, and an optical element that is attached to an end surface of the ferrule, wherein a protrusion that includes the through hole is formed on the end of the ferrule, and the optical element is attached to the end surface of the protrusion.

In addition, an optical receptacle of the present invention comprises a fiber stub with an optical element as described above; a sleeve where a plug ferrule for an optical connector is held in an opening on one side and the rear end of the ferrule of the fiber stub is inserted into an opening on the other side; and a holder having a through hole to which the front end of the ferrule has been inserted and secured.

Furthermore, an optical module of the present invention is provided with an optical unit comprising a light emitting element and an optical receptacle as described above, wherein the light from the light emitting element enters into the optical element of the optical receptacle.

According to the present invention, the optical element is attached to the end surface of a protrusion that has been formed on the end of the fiber stub, and therefore, when the optical element is joined by means of adhesion, the optical element can be prevented from running out of the end surface of the protrusion by the surface tension of an adhesive. In addition, the optical element tends to be located at approximately the center of the end surface of the protrusion due to the surface tension of the adhesive. Therefore, the positioning of the optical element in being adhered to the fiber stub becomes easy, increasing the yield and simplifying the fabrication process.

In addition, the optical element can be prevented from being misaligned with the optical fiber, even in the case where the area of the optical element is reduced. Accordingly, the optical element can be downsized to a great extent in comparison with the conventional structure. Here, it is preferable for the area of the optical element to be equal to or smaller than the area of the end surface of the protrusion in the cross section perpendicular to the optical axis of the optical element.

The optical element may be an optical isolator element with a magnet, an optical isolator element without a magnet, a Faraday rotator mirror, a transparent plate with an AR coating or the like. The effects that the positioning of the optical element becomes easier and the optical element can be downsized are gained irrespective of the type of optical element. Here, a significant effect can be gained, particularly when the optical element is an optical isolator with a magnet.

That is to say, as a result of the downsizing of the optical isolator element, the magnet for applying a magnetic field to the optical isolator element can also be miniaturized. Accordingly, the entirety of the optical isolator can be miniaturized and thus the optical fiber stub with the optical isolator and the optical receptacle in which this optical fiber stub is built can also be miniaturized. Furthermore, the entirety of the optical module can also be miniaturized. This is because the counterbore portion becomes small or even eliminated, which is formed for providing an enough accommodation of optical isolator so that its position can be adjusted when the optical receptacle is incorporated into an optical module such as a semiconductor laser.

Furthermore, in the case where the optical element is an optical isolator element with a magnet, it becomes possible to secure the magnet to the end of the fiber stub. That is to say, an optical isolator (optical isolator element+magnet) can be formed directly on the end of fiber stub. In the case where the magnet is formed into a cylinder and the protrusion on the end of the fiber stub is formed into a columnar form, for example, the protruding portion of the ferrule can be inserted into the magnet so as to be secured therein.

In this case, if the outer diameter of the magnet is the same as or smaller than the outer diameter of the ferrule, the magnet itself can be inserted into the metal holder together with the fiber stub when the stub is inserted and secured to the metal holder of the optical receptacle. Accordingly, the optical receptacle can be miniaturized and lowered in cost.

In addition, the whole optical isolator can be attached to the end of the fiber stub, and therefore, the forms and dimensions of the magnet and the optical isolator element can be made constant, irrespective of the form of the metal holder. Accordingly, the parts of the optical isolator can be unified, making product management easy.

Moreover, the optical properties of the fiber stub to which the optical isolator is attached can be inspected before the fiber stub is incorporated to the metal holder. Therefore, it is possible for the fiber stub with an optical isolator to be fabricated in advance as a common part. As a result of this, it becomes possible to deliver various products with various shapes of metal holders in a short period of time, even in the case where such products are newly ordered.

A manufacturing method for an optical receptacle according to the present invention comprises the steps of:

forming a fiber stub with an optical element by attaching the optical element to the fiber stub;

forming an optical receptacle by securing the front end of the fiber stub with the optical element to a holder; and securing the rear end to a sleeve into which an optical connector can be inserted.

In the case where an optical element such as an optical isolator is attached to the fiber stub before the fiber stub is attached to a holder, it is possible to inspect the optical properties of the fiber stub with an optical element parallel to the process of forming the holder. In addition, even in the case where there are a variety of specifications for the holder, it becomes possible to deliver optical receptacles in a short period of time by producing fiber stubs with optical elements in advance.

It is preferable to provide the inspection step of inspecting the optical properties of the fiber stub with an optical element after the step of forming the fiber stub with an optical element and before the step of forming an optical receptacle. In the case where the optical element is an optical isolator, for example, it is preferable to measure the insertion loss and the isolation.

When the insertion loss is measured, light may be made to enter into the optical isolator side of the fiber stub, and maximum output $P_1$ of light that is emitted from the rear end of the fiber stub may be measured while the fiber stub with an optical isolator is being rotated around the optical axis, so that the insertion loss can be measured on the basis of this maximum output $P_1$. When the isolation is measured, light may be made to enter from the rear end side of the fiber stub with an optical isolator, and maximum output $P_2$ of light that is emitted from the optical isolator may be measured while the fiber stub with an optical isolator is being rotated around the optical axis, so that the isolation can be measured on the basis of this maximum output $P_2$. By measuring the insertion loss and the isolation according to these methods, the use of a polarization scrambler for converting output light from a light source into random polarized waves can be eliminated. In addition, the insertion loss and the isolation can be measured only by inverting the direction of the fiber stub itself, instead of inverting the polarities of the magnet. Accordingly, the inspection unit and the inspection process for the insertion loss and the isolation can be simplified.

DESCRIPTION OF THE PREFERRED EMBODIMENTS

In the following, the embodiments of the present invention are described in reference to the drawings. Here, the same symbols are used for parts that are the same as those in the prior art.

Fiber Stub with Optical Isolator

Figure 1:
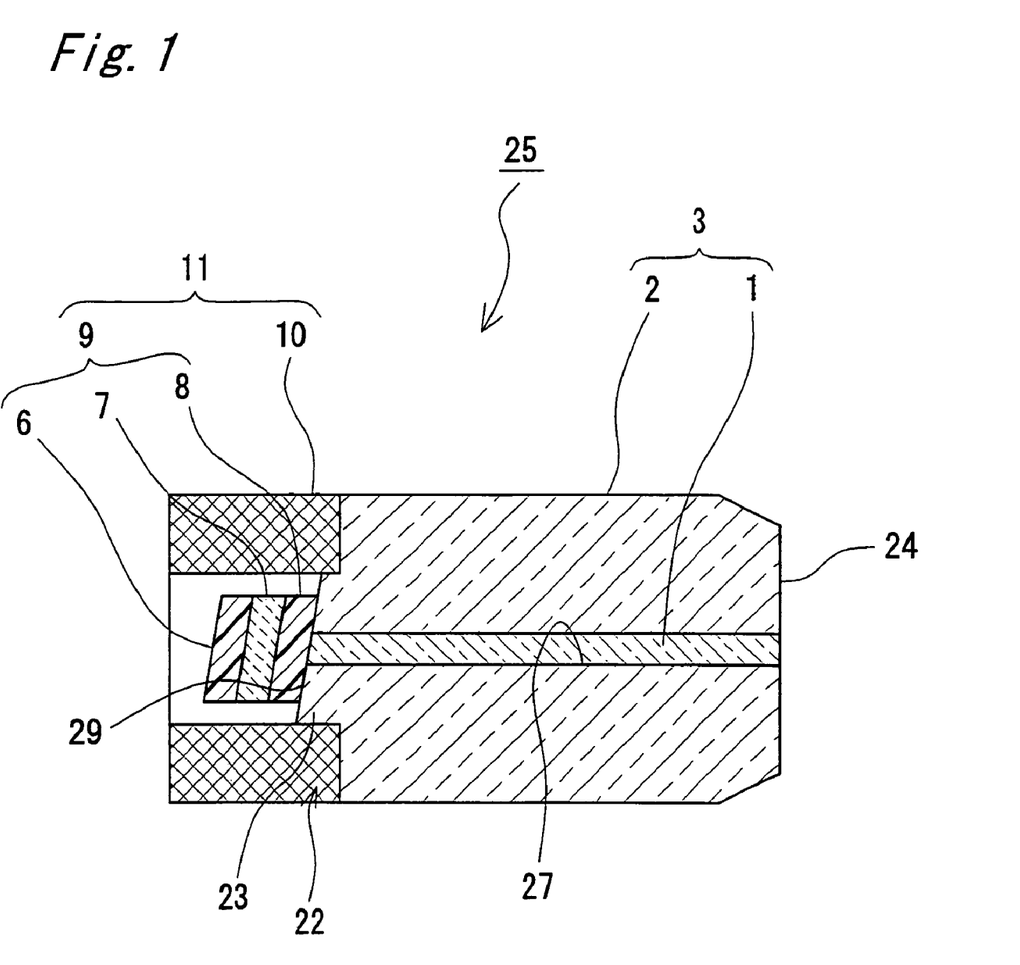
FIG. 1 is d longitudinal cross-sectional diagram showing a fiber stub with an optical isolator.

FIG. 1 is a longitudinal cross-sectional diagram showing a fiber stub 3 with an optical isolator. An optical fiber 1 is inserted into a through hole 27 at the center of a ferrule 2 made of ceramic or glass material, such as zirconia or alumina, so as to be held therein by means of an adhesive. The fiber stub 3 is composed of the ferrule 2 and the optical fiber 1.

A step 22 is created by processing an end of fiber stub 3 so as to provide a protrusion 23 in cylindrical form having an outer diameter of not greater than 0.5 mm. It is preferable for the protrusion 23 to be formed so that the optical axis of the optical fiber 1 is located at the center thereof In addition, it is necessary for the outer diameter of the protrusion 23 to be at least greater than the diameter of the spot of the beam that is emitted from a semiconductor laser, which is described below. The diameter of the spot of the beam is generally in a range from 0.2 mm to 0.25 mm. The height of the protrusion 23 should be great enough so that a liquid adhesive applied to the end of the protrusion can hold its form due to surface tension. Accordingly, it is preferable for the height of the protrusion at the center of the surface having the step to be at least 80 μm or greater. In addition, in the case where the protrusion 23 is engaged with an annular magnet, it is preferable for the height of the protrusion to be not less than 150 μm, so that the strength for securing the magnet is enhanced. Conversely, in the case where the protrusion 23 is too high, a problem arises that the protrusion 23 may be easily chipped. Accordingly, it is preferable for the height of the protrusion 23 to be not greater than 350 μm. Here, the form of the cross section of the protrusion 23 is not limited to a circle The protrusion 23 may have an approximately cylindrical shape of which the cross section is an ellipsis, for example, or it may have a column shape of which cross section is a rectangle. The protrusion 23 having a rectangular cross section can be fabricated by dicing the end of the fiber stub 3.

A polishing process may be carried out on an end surface 29 of the protrusion 23 so that it is inclined by 8° relative to a plane that is perpendicular to the optical axis, in order to suppress light returning to an optical element 12, such as a semiconductor laser, due to a near end reflection. An optical isolator element 9, described below, is joined to this end surface 29 (hereinafter referred to as "a stepped surface 29") of the protrusion 23. Here, the stepped surface 20 may be a plane perpendicular to the optical axis, instead of a surface on which a polishing process has been carried out diagonally.

In the case when utilized in an optical receptacle, a polishing process for a curved surface is carried out on an rear end surface 24 of the fiber stub 3 for the contact with the end of the plug ferrule of an optical connector, not shown.

According to the present invention, it is preferable for the area of projection of the optical isolator element 9 onto a plane that is perpendicular to the optical axis to be the same as or smaller than that area of the stepped surface 29. That is to say, it is preferable for the optical isolator element 9 to have a size that allows for installation in a region surrounded by the outer periphery of the stepped surface 29. By doing so, the optical isolator element 9 that is attached to the stepped surface 29 can be contained within the outer diameter without sticking out from the side of the protrusion 23. In addition, the optical isolator element can be prevented from hitting against the inner peripheral surface of a magnet 10.

Figure 3:
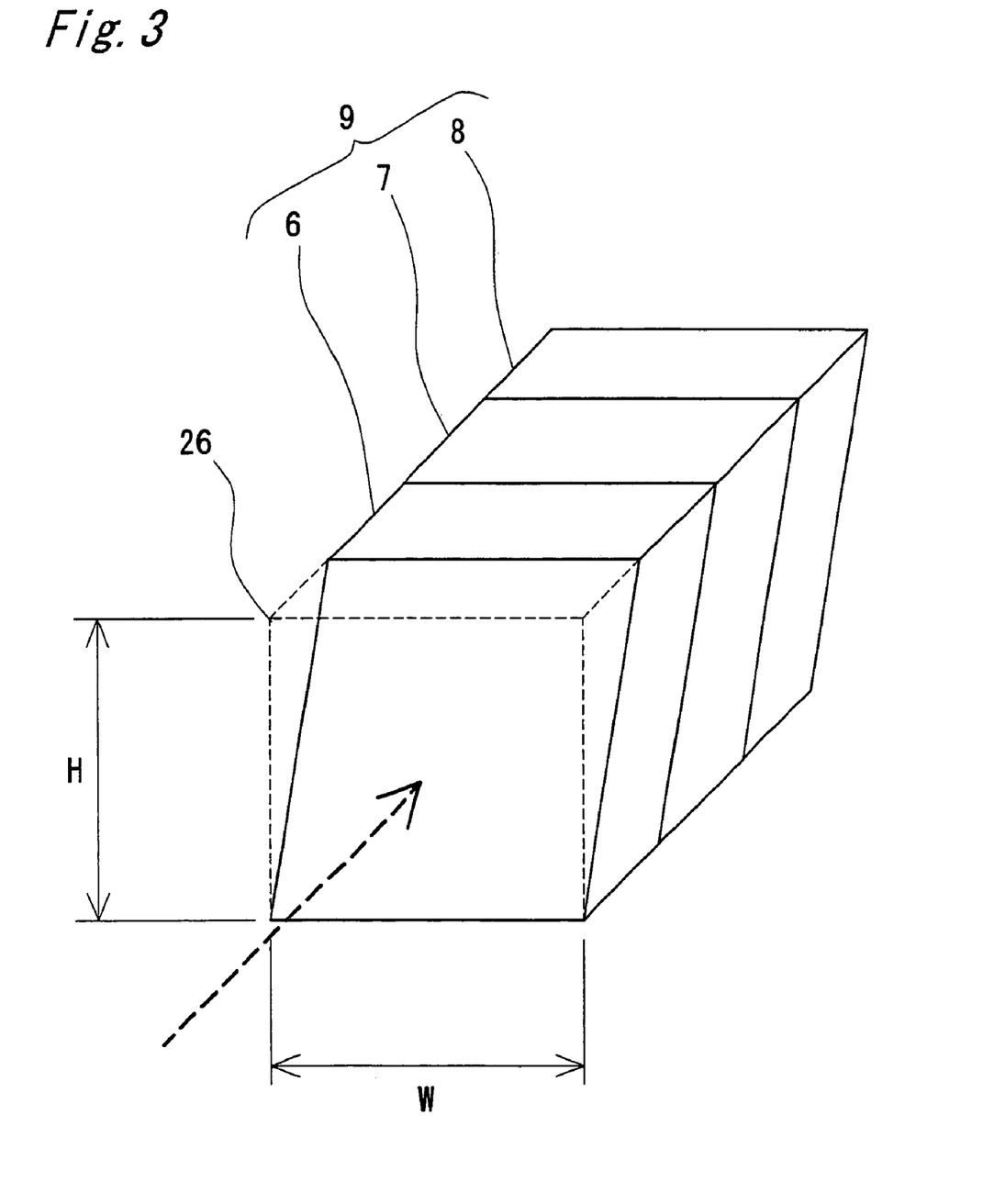
FIG. 3 is a perspective diagram showing an optical isolator element 9.

As shown in FIG. 3, the surface into which light enters and the surface from which light is emitted of the optical isolator element 9 are inclined by a predetermined angle relative to a plane 26 that is perpendicular to the optical axis. Accordingly, the area of the plane 26 that is perpendicular to the optical axis is smaller than the area of the surface where the element makes contact with the stepped surface 29 of the ferrule. In the present embodiment, this plane 26 is formed so as to have a size of, for example, length 0.35 mm.times..width 0.35 mm or smaller, so that the outer diameter of perpendicular cross section 26 becomes equal to or smaller than the outer diameter of the protrusion 23 of the fiber stub 3.

The optical isolator element 9 may be composed of a polarizer 6, a Faraday rotator 7 and an analyzer 8. These are made to adhere to each other and are secured by means of an adhesive after the transmitting polarization planes of the polarizer 6 and the analyzer 8 are adjusted with each other to form an angle of 45°. In addition, the optical isolator element 9 is formed so that the surface where light enters into or from is inclined by 8°, which is the same as the angle of the polished end of the fiber stub 3. This optical isolator element 9 is cut out in a size so that the element 9 can be placed within the outer diameter of protrusion 23 of the fiber stub 3. The optical isolator element 9 is made to adhere and secured to the stepped surface 29 on the end of the fiber stub 3. At this time, the transmitting polarization plane of the polarizer 6 may be adjusted to be perpendicular or lateral relative to the direction of the maximum inclination of the stepped surface 29 of the fiber stub 3 that has been polished diagonally at 8°.

Figure 4A:
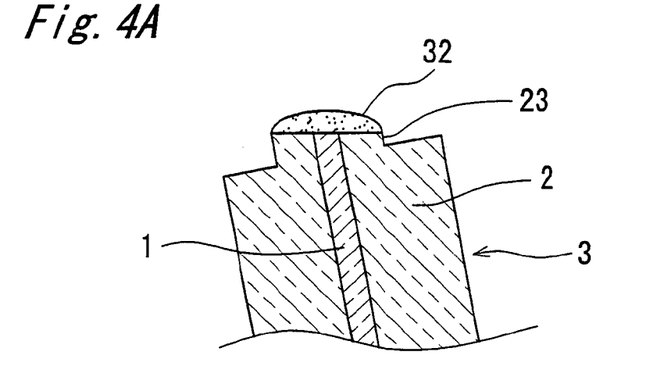
FIGS. 4A to 4C are schematic diagrams illustrating a method for making an optical isolator adhere to a protrusion of a fiber stub.
Figure 4B:
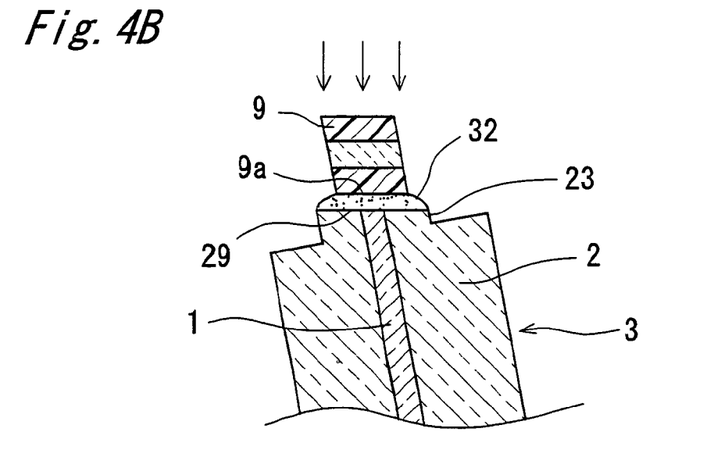
Figure 4C:
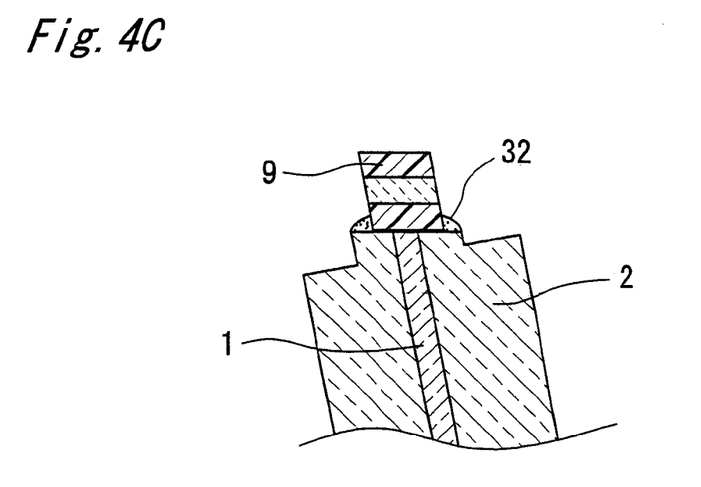

FIGS. 4A to 4C are schematic diagrams illustrating a method for securing the optical isolator element 9 to the protrusion 23 at the end of the fiber stub 3 by means of adhesion. First, as shown in FIG. 4A, the fiber stub 3 is installed in a manner where the stepped surface 29 that has been formed at the end thereof becomes horizontal, and an appropriate amount of adhesive 32 is applied to the stepped surface 29. It is preferable for the adhesive 32 to be a liquid having a high surface tension before curing.

Next, the optical isolator element 9 is stably placed on the adhesive 32 in its liquid form that has been applied to the protrusion 23 of the fiber stub 3. At this time, the optical isolator element 9 does not stick out from the outside of the protrusion 23, due to the surface tension of the adhesive 32.

Accordingly, if the outer diameter of the optical isolator element 9 is properly selected, the center of the optical isolator element 9 can be approximately aligned with the center of the through hole 27, by utilizing the surface tension of the adhesive 32.

Next, as shown in FIG. 4C, the optical isolator element 9 is pressed against the stepped surface 29 or the fiber stub. After that, the adhesive 32 is cured by applying heat, in an oven or the like. If the adhesive 32 is cured after the optical isolator element 9 has been pressed against the stepped surface 29, the optical isolator element 9 can be prevented from sliding during curing, so that a misalignment of the isolator element can be prevented from occurring.

Figure 5:
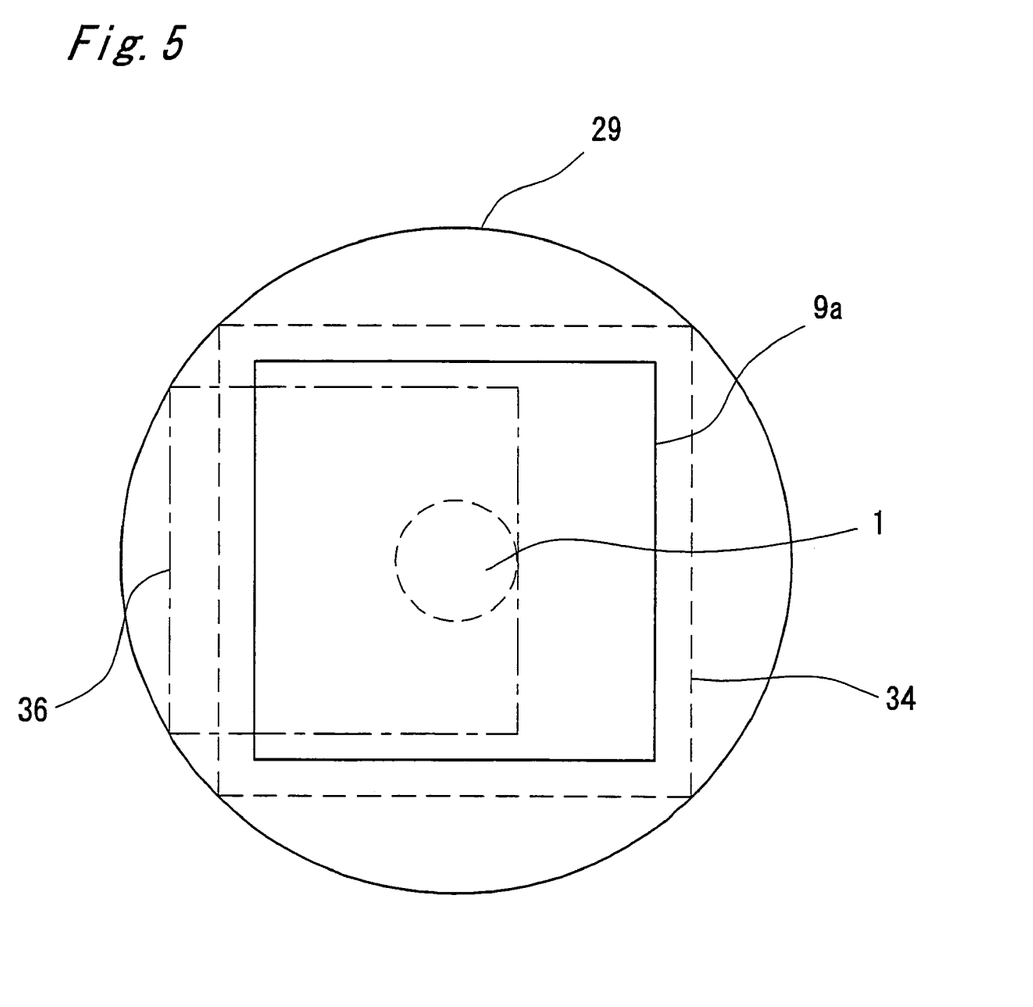
FIG. 5 is a schematic plan diagram showing the relationship between the end surface (surface having steps) of the protrusion and the size of the optical isolator.

According to this method, the surface tension of the adhesive prevents the optical isolator element 9 from protruding from the stepped surface 29 of the protrusion 23, even in the case where optical isolator element 9 is miniaturized, add the optical isolator element 9 can be installed in a manner where the through hole 27 into which the optical fiber 1 has been inserted is adjusted to be approximately at the center. Here, in order to effectively utilize the surface tension, it is preferable for the outer diameter of a surface 9a of the optical isolator element 9 that makes contact with the protrusion 23 (=end surface on the side from which light is emitted) to be smaller than the outer diameter of the stepped surface 29 in the state where the optical isolator element 9 is mounted on the stepped surface 29. As shown in FIG. 5, for example, it is preferable for the contact surface 9a to be smaller than a "maximum size" shown by broken lines 34 where the corner points of the rectangular contact surface 9a are on the outer periphery of the stepped surface 29 that is in approximately elliptical form. At the same time, the optical isolator element 9 should be greater than the diameter of the beam emitted from a semiconductor laser. The diameter of the beam emitted from a semiconductor laser is generally in a range from 0.2 mm to 0.25 mm. Accordingly, it is preferable for contact surface 9a to have a size that contains at least a circle having a diameter of 0.2 mm. Further, if the contact surface 9a is too small in comparison with the stepped surface 29, the optical fiber 1 may go out from the optical isolator element 9. As shown in FIG. 5, for example, it is preferable for the contact surface 9a to be greater than a "minimum size" shown by alternate-long-and-short dash line 36 where the outer periphery of the optical fiber 1 makes contact with the outer periphery of the contact surface 9a when two corners of the rectangular contact surface 9a are on the outer periphery of the stepped surface 29.

Figure 2:
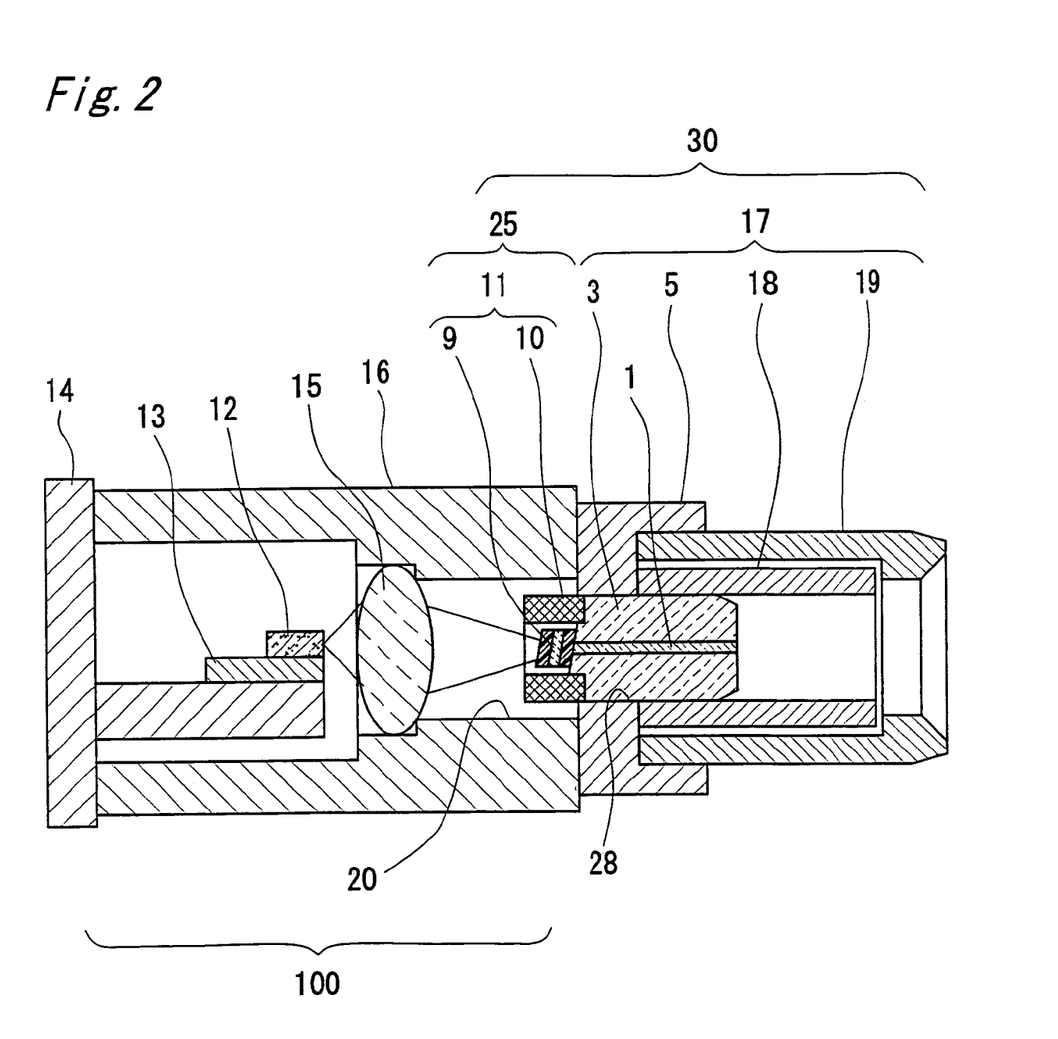
FIG. 2 is a longitudinal cross-sectional diagram showing a semiconductor laser module.

As shown in FIG. 1, the magnet 10 for applying a magnetic field to the Faraday rotator 7 may be in cylindrical form, and it is preferable for the outer diameter of the magnet to be set equal or smaller than the minimum outer diameter of a generally used fiber stab 3, which is typically 1.25 mm. In the case where the outer diameter of the magnet 10 is not greater than the outer diameter of the fiber stub 3, the magnet can be prevented from protruding from the ferrule in the direction of the diameter of the ferrule, and the entirety of the fiber stub with an optical isolator can be made to be in approximately columnar form. Accordingly, as shown in FIG. 2, an optical module can be designed so that a portion of the magnet 10 is inserted and secured to a through hole 28 of a metal holder 5 together with the fiber stub 3. As a result of this, the optical receptacle and the optical module can also be miniaturized.

The inner diameter of the magnet 10 is set to the same as or larger than the outer diameter of the protrusion 23 of the fiber stub 3. As a result of this, the magnet 10 can be fitting with the step 22 created by processing the fiber stub 3. Though the magnet 10 may be secured to the fiber stub by means of an adhesive, the strength for securing the magnet can further be enhanced when the magnet 10 is inserted into the step 22. A fiber stub 25 with an optical isolator is formed by securing the magnet 10 to the protrusion 23 of the fiber stub 3.

Optical Module and Optical Receptacle

FIG. 2 shows a longitudinal cross-sectional diagram showing a coaxial semiconductor laser module. A PD (photo diode) for monitoring and lead wires for wiring the PD (photo diode) are omitted in FIG. 2. The optical module of FIG. 2 is composed of an optical receptacle 30 with an optical isolator, and an optical unit 100 which is attached to an end surface of the optical receptacle 30.

The optical unit 100 is composed of a semiconductor laser 12, a heat sink 13, a metal stem 14, a lens 15 and a lens holder 16. The semiconductor laser 12 is mounted on the heat sink 13 by means of soldering. The heat sink 13 it also mounted on and secured to the metal stem 14, where a support vertically protrudes from a plane in columnar form, by means of soldering. The lens holder 16 is formed in cylindrical form so as to surround the side of the column of the metal stem 14, and may be made of a material that can be resistance welded. The lens holder 16 is secured so as to contain the semiconductor laser 12 and the heat sink 13. In addition, the lens 15 is secured to an inner periphery 20 of the lens holder 16 on the downstream side of the laser light path of the semiconductor laser 12 by means of a low melting point glass or the like.

The optical receptacle 30 with an optical isolator is composed of a fiber stub 25 with an optical isolator, a metal holder 5, a sleeve 18 and a shell 19. A polishing process for a curved surface has been carried out on the rear end surface of the fiber stub 25 for the engagement with the end of the plug ferrule of an optical connector, which is not shown. The rear end side of the fiber stub 25 with an optical isolator is covered with the sleeve 18 that is in hollow cylindrical form and made of ceramic or metal. The sleeve 18 is surrounded by the shell 19, which is made of metal or plastic, and is inserted and secured to the metal holder 5.

The metal holder 5 is generally formed in a cup form having a bottom, and has a through hole 28 which runs in the direction of the thickness starting from the center of the bottom. The front end side of the fiber stub 25 with an optical isolator is inserted tightly into and held by this through hole 28. Though a stainless steel having excellent anti-corrosive properties and welding properties, such as SUS304, is preferably used as the material for the metal holder 5, any weldable material, such as iron or nickel, may be used.

A split sleeve that has been processed so as to have a slit along the entire length of a cylinder made of phosphor bronze or a ceramic material can be used as the sleeve 18. A plug ferrule (not shown) for an optical connector is held in an opening on one side of the sleeve 18, and the rear end side of the ferrule of the fiber stub 25 is inserted into an opening on the other side of the sleeve 18.

The shell 19 is formed in cylindrical form, and the sleeve 18 is entirely contained in the shell 19, in a state where the sleeve 18 is apart from the side wall of the metal holder 5. The shell 19 can be tightly inserted into and held by the metal holder 5. A metal or plastic may used as the material of the shell 19. Thus, the shell 19 covers the sleeve 18 into which the fiber stub 3 has been tightly inserted, and this shell 19 is inserted and secured to the inside of the metal holder 5 so as to form an optical receptacle 17.

In the present embodiment, a portion of the magnet 10 of an optical isolator 11 is inserted and secured to the through hole 28 of the metal holder. As a result of this, the joint portion between the magnet 10 and the fiber stub 3 is protected, and the optical receptacle can be miniaturized. That is to say, magnet 10 is prevented from being detached, even in the case where magnet 10 slightly touches an inner peripheral surface 20 of the lens holder 16 at the time when the optical axis of the optical receptacle 17 is adjusted, and thus reliability is increased. In addition, an optical module which is compact and low in cost can be provided.

In addition, according to the present embodiment, the dimensions of the magnet 10 and the optical isolator element 9 of the optical isolator 11 can be determined irrespective of the dimensions of the metal holder 5. Though it is conventionally necessary to change the design of the optical isolator 11 for respective specifications of the metal holder 5, the parts of the optical isolator 11 can be unified irrespective of the specifications of the metal holder 5 in the present embodiment. Accordingly, product management for an optical receptacle 30 and for an optical module becomes easy.

Manufacturing Process for Optical Module

Next, a manufacturing process for an optical module is described.

First, an optical receptacle 30 with an optical isolator is prepared. In order to manufacture the optical receptacle 30 with an optical isolator, as in the prior art shown in FIG. 9, an optical isolator 11 may be attached after an optical receptacle 17 has been formed. According to the present invention, however, the optical isolator 11 can be attached to a fiber stub 3 before the fiber stub 3 is attached to a metal holder 5. Accordingly, it is possible to inspect the isolation properties and the like of the fiber stub with all optical isolator parallel to the process for forming the metal holder. In addition, the fiber stub with an optical isolator can be produced in advance. Accordingly, it becomes possible to deliver an optical receptacle in a short period of time.

Next, an optical module is assembled from the optical receptacle 30 with an isolator and the optical unit 100. In the optical module, light that has been emitted from the semiconductor laser 12 is focused by means of the lens 15 so as to be guided to the optical fiber 1 via the optical isolator 11. Accordingly, it is necessary to adjust the position of the optical receptacle 17 so that light that has been focused by means of the lens 15 appropriately enters into the optical fiber 1. The position is adjusted by shifting the optical receptacle 30 to front or rear side after the end of the optical receptacle 30 with an isolator has been inserted into the lens holder 16. If the outer diameter of optical isolator 11 is sufficiently small relative to the inner periphery 20 of the lens holder 16 in the optical receptacle 30, it is not necessary to provide a counterbore portion 21 like the one shown in FIG. 9. In addition, even in the case where the optical isolator 11 makes contact with the inner wall of the lens holder 16, the magnet 10 in the optical isolator 11 is firmly secured to the fiber stub 3, and therefore, defects, such as detachment of the magnet 10, do not easily occur. When the positional adjustment of the optical receptacle 17 is completed, the metal holder 5 of optical receptacle 17 is secured to the lens holder 16 by means of laser welding or the like.

Method for Inspecting Optical Properties

The method for inspecting optical properties (insertion loss and isolation) according to the present embodiment is described below. The inspection can be carried out either after an optical receptacle with an optical isolator has been assembled or at the time when a fiber stub with an optical isolator is assembled. In the case where the fiber stub with an optical isolator is assembled in advance and stored after the inspection, there is an advantage that the optical receptacle and the optical module can be delivered in a short period of time.

Figure 6A:
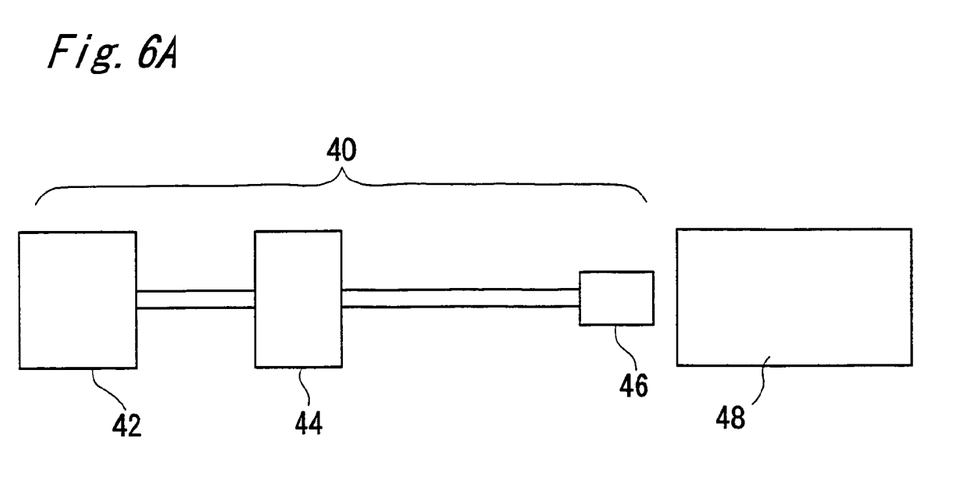
FIGS. 6A and 6B are schematic diagrams illustrating a method for measuring the optical properties of the optical receptacle with an optical isolator.

First, the case where optical measurement is carried out after the assembly of an optical receptacle with an optical isolator is described. A light source 40 is prepared, in order to measure the insertion loss and the isolation. As shown in FIG. 6A, the light source 40 is composed of a unit 42 for generating light, such as a laser, a polarization scrambler 44 and an optical connector 46, which are connected to each other through optical fibers. Here, the polarization scrambler 44 is used in order to convert light emitted from the light source 40 into random polarized waves. Thus, output $P_0$ of the light source 40 is measured by a detector 48.

Figure 6B:
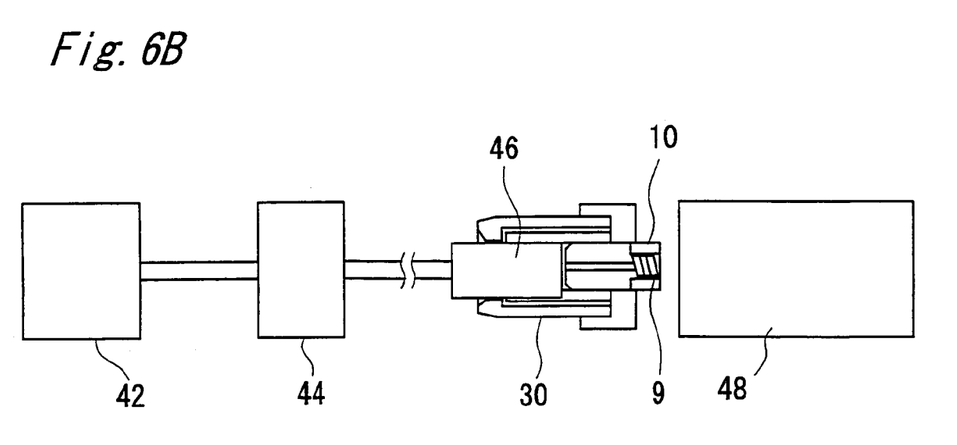

When the insertion loss and the isolation are measured, the optical connector 46 of the light source 40 is inserted into the optical receptacle 30, and light is made to enter into the output side of the optical receptacle 30. Then, the output of light that has been emitted from the optical isolator 9 is measured by the detector 48. At this time, the insertion loss becomes $(P_0-P_1)$, where $P_1$ is the maximum output when measurement is carried out with the polarity of the magnet 10 inverted. The isolation becomes $(P0-P_2)$, where $P_2$ is the maximum output when measurement is carried out with the normal polarity of the magnet 10. As described above, in the case where the optical properties of the optical receptacle 30 with an optical isolator are measured, a polarization scrambler is necessary, and it is necessary to invert the polarity of the magnet 10 for each of two measurements, making measurements complicated.

Figure 7A:
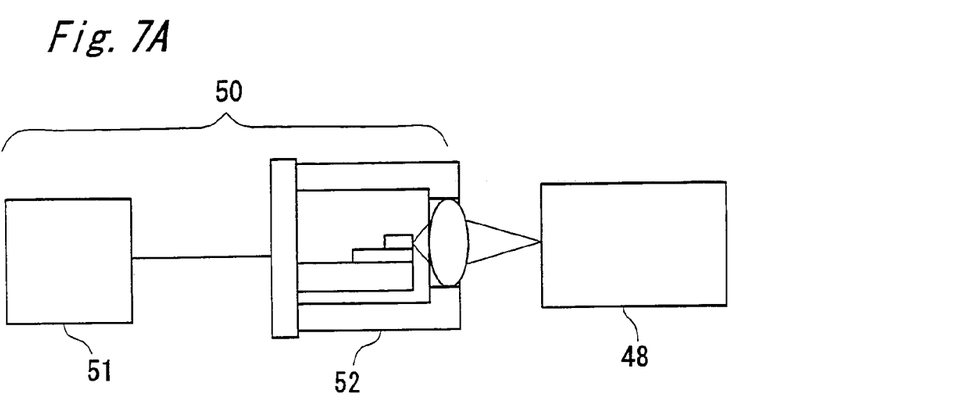
FIGS. 7A to 7C are schematic diagrams illustrating a method for measuring the optical properties of the fiber stub with an optical isolator.

Next, the method for measuring the insertion loss and the isolation of the fiber stub 25 with an optical isolator. According to the present embodiment, measurement can be carried out in a simple method, as follows:

First, as shown in FIG. 7A, a laser unit (LD-CAN) 52 with a lens which is combined with a driver 51 for driving is prepared as a light source 50 for measurement. The optical unit 100 itself of the optical module may be used as the laser unit 52 with a lens. In this case, there is an advantage that the properties of the optical isolator in the optical module, which is the final product, can be inspected with high precision. Output $P_0$ of the light source 50 is measured in advance by a detector 48.

Figure 7B:
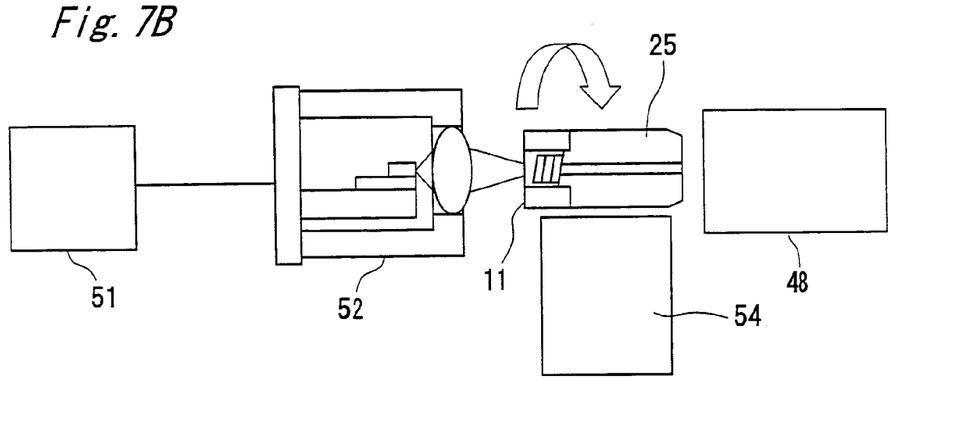

Next, the insertion loss is measured. As shown in FIG. 7B, the fiber stub 25 with an optical isolator is installed on an XYZ θ stage which is rotatable around the optical axis of the measurement system, and light from the light source 50 is made to enter into the optical isolator 11 side. Then, the output of light that has been emitted from the rear end surface (PC end surface) of the fiber stub 25 is measured by a detector 48. The output is measured While rotating the fiber stub 25 to find maximum value $P_1$ of the gained output of light, and thus, the insertion loss becomes $(P_0-P_1)$.

Figure 7C:
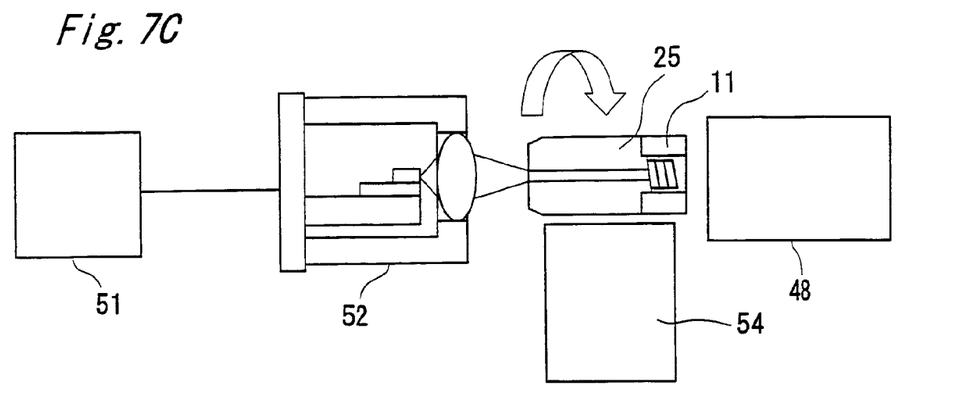

Next, the isolation can be measured with the same measurement system as that for the insertion loss, with the direction of the fiber stub 25 with an optical isolator inverted. That is to say, as shown in FIG. 7C, light is made to enter into the rear end surface (PC end surface) of the fiber stub, and the output of light that has been emitted from the optical isolator 11 side is measured by the detector 48. The output is measured while rotating the fiber stub 25 to find maximum value $P_2$ of the gained output of light, and thus, the isolation becomes $(P_0-P_2)$ As described above, according to the inspection method of the present embodiment, the output is measured while rotating the fiber stub 25 with an optical isolator, and therefore, a polarization scrambler for converting the output light of a light source into random polarized waves becomes unnecessary. In addition, the insertion loss and the isolation can be measured simply by inverting the direction of the fiber stub 25 itself, rather than by inverting the polarity of the magnet. Accordingly, the inspection unit and the inspection process for the insertion loss and the isolation can be simplified.

Here, such an inspection method becomes possible by utilizing high precision in the outer diameter of the fiber stub 25, where the standard for the outer diameter has been determined. That is to say, in the case of an optical receptacle, there are a variety of forms of the metal holder in accordance with applications and users, and in many cases, a flange is attached to the metal holder. Therefore, it is necessary to prepare a great number of types of rotational stages for rotating the optical receptacle, making preparation for the measurement unit extremely complicated. In addition, the precision in the outer diameter of the metal holder is as poor as +/-50 μm or greater, providing a great deal of decentering during the rotation. Therefore, it is difficult to measure a stable output of light while rotating the optical receptacle. In contrast to this, the standard for the outer diameter of the fiber stub 25 has been approximately determined, and therefore, only several types of rotational stages must be prepared. In addition, precision in the outer diameter of the fiber stub made of zirconia or the like is as high as +/-1 to 2 μm, causing almost no decentering at the time of the rotation. Accordingly, it is possible to measure a stable output of light, even while rotating the optical receptacle.

In the embodiment shown in FIGS. 1 to 7, a case is described where the optical element that is secured to the end of the fiber stub is an optical isolator with a magnet. However, the present invention is not limited to this. Any type of optical element may be used so long as the element is secured to the end of the fiber stub and needs to be positioned relative to the optical fiber in the fiber stub.

The optical element may be, for example, an optical isolator that does not require a magnet. Latching garnets have their own magnetic force, and therefore, an optical isolator without a magnet can be formed by using latching garnets for a Faraday rotator. In the case of an optical isolator without a magnet, it is not necessary to secure a magnet around the optical isolator element after the element has been made to adhere to the protrusion provided at the end of the fiber stub. Accordingly, the outer diameter of the end of the fiber stub 3 may be exactly the same as that of the body portion. In addition, the optical isolator is secured to the protrusion at the end of the fiber stub by means of adhesion, and therefore, is located well inside of the outer periphery of the fiber stub. Accordingly, in the case where the fiber stub is inserted into the lens holder of the semiconductor laser module so as to be positioned, it is not necessary to provide a counterbore for preventing contact between the fiber stub and the optical isolator inside the lens holder. Thus, the semiconductor laser module can be miniaturized.

In addition, the optical element that is secured to the end of the fiber stub may be a Faraday rotator mirror made of a Faraday rotator to which a total reflection mirror coating has been applied, and a magnet. In this case also, the same the same effects as in the case of the above described optical isolator with a magnet can be gained. Here, a fiber stub with a Faraday rotator mirror is appropriate for the application of an optical sensor. Furthermore, the optical element may be mere glass to which an AR coating has been applied. This glass is provided to the end of the fiber stub, and thereby, laser light can be prevented from returning.

EXAMPLES

In the following, an optical module having a fiber stub with an optical isolator as shown in FIGS. 1 and 2, as well as an optical receptacle, was fabricated as an example of the present invention. The optical module was a coaxial optical receptacle type semiconductor laser module.

As shown in FIG. 1, d fiber stab 3 was formed by securing the optical fiber 1 by means of adhesion to the through hole 27, of which outer diameter was 1.25 mm, located at the center of the ferrule 2 made of zirconia. A step 22 was formed by processing the front end side of the fiber stub 3, and thus, a protrusion 23 having an outer diameter of 0.5 mm was provided. Then, the surface 29 of the protrusion 23 was polished to incline by 8°. In addition, the rear end surface of the fiber stub 3 was polished to have a curved surface so that it could be engaged with the end of a plug ferrule of an optical connector, which is not shown.

Meanwhile, as shown in FIG. 3, the surface of the optical isolator element 9 where light enters into was inclined by 8°, which is the same as the polishing angle of the fiber stub 3. The optical isolator element was cut so that a cross section 26 of the optical isolator element in a direction perpendicular to the optical axis became 0.3 mm in length and 0.3 mm in width, which was the size that could be contained within the outer diameter of the protrusion 23 of the fiber stub 3. Here, the polarizer 6, the Faraday rotator 7 and the analyzer 8 of the optical isolator element 9 were adjusted in advance through rotation around their axis so that the transmitting polarization planes of the polarizer 6 and the analyzer 8 formed an angle of 45°, and after that, they were secured to each other by means of an adhesive The transmitting polarization plane of the polarizer 6 was set perpendicular to the stepped surface 29 of the fiber stub 3 inclined by 8°.

The magnet 10 in cylindrical form for applying a magnetic field to the Faraday rotator 7 had an outer diameter of 1.2 mm, an inner diameter of 0.6 mm and a length of 1 mm. The step 22 that was created by processing the fiber stub 3 was inserted into the magnet 10 and the magnet 10 was secured by means of an adhesive. Thus, the fiber stub 25 with an optical isolator was formed.

As shown in FIG. 2, the semiconductor laser 12 was mounted on the heat sink 13 and secured by means of soldering. In the same manner, the heat sink 13 was mounted on and secured to the metal stem 14. The lens 15 was secured to the lens holder 16 made of a stainless steel material by means of low melting point glass, and the lens holder 16 was resistance welded to the metal stem 14.

The front end side of the fiber stub 25 with an optical isolator was tightly inserted and secured to the through hole 28 of the metal holder 5 in a position where the step 22 that is created by processing the fiber stub 3 is did not protrude from the through hole 28. In addition, the rear end side of the fiber stub 3 was inserted into the sleeve 18 made of zirconia, and the sleeve 18 was inserted into the shell 19 made of a stainless steel material. Then, the shell 19 was tightly inserted and secured to the metal holder 5 so as to form the optical receptacle 17. The position of the optical receptacle 17 was adjusted so that light that had been focused by the lens 15 appropriately entered into the optical fiber 1, and after that, the metal holder 5 of the optical receptacle 17 was secured to the lens holder 16 by means of laser welding.

Table 1 shows comparisons between a semiconductor laser module according to the prior art and a semiconductor laser module of an example of the invention. Comparisons are shown concerning the area of the cross-sectional end surface, on the side into which light enters, perpendicular to the optical axis of the fiber stub, polishing time for this surface, the area of a cross section perpendicular to the optical axis of the optical isolator element, the outer diameter of the magnet thereof, and the existence of a counterbore portion that is specified for an optical isolator inside the lens holder.

TABLE 1

| Points of comparison | | Prior art | Example | Reduction ratio |
|---|---|---|---|---|
| End surface of fiber stub on incident side | Area of Perpendicular Cross Section | about 1.2 mm$^2$ | about 0.2 mm$^2$ | 84% |
| | Polishing Time | about 6 min. | about 3 min. (including Step Forming) | about 50% |
| Optical Isolator | Area of Perpendicular Cross Section | about 0.2 mm$^2$ | about 0.12 mm$^2$ | about 40% |
| | Outerdiameter of Magnet | 2 mm | 1.2 mm | 40% |
| Lens Holder | Counterbore | Yes | No | — |

In the optical module of the example, the protrusion 23 was provided on the front end side of the fiber stub 3 which is the side into which light enters, and the stepped surface 29 of this side was diagonally polished, and thereby, the area of the polished surface became 20% or less of that in the prior art. As a result of this, work time for the diagonal polishing could be reduced by approximately 50%, even when the additional process for the step 22 was included. The optical isolator element was secured to the stepped surface 29 of the protrusion 23 by means of adhesion in the present example. The cross section area of the optical isolator element 9 in a direction perpendicular to the optical axis was approximately 0.12 mm$^2$, which was reduced by approximately 40% from approximately 0.2 mm$^2$ in the prior art. Therefore, the number of pieces of the optical isolator element per unit area was increased, and thus the cost could be reduced.

Furthermore, the magnet was secured to the step 22 created by processing the fiber stub 3 through insertion. The outer diameter of the magnet 10 in cylindrical form was 1.2 mm, which was reduced by 40% from that in the prior art. Thus, the optical isolator 11 could be miniaturized. In addition, optical isolator 11 could be formed without waiting for the processing of the metal holder 5 that holds the fiber stub 3. Also, it became possible to unify the size of the optical isolator 11, which simplifies product management and shorten a delivery time.

The outer diameter of the optical isolator 11 was made smaller than the outer diameter of the fiber stub 3, and thereby, it became unnecessary to provide a specific counterbore portion for containing the optical isolator 11 in the internal periphery 20 of the lens holder 16 of the optical module. As a result, the lens holder 16 could be lowered in cost, and it became possible to provide at low cost a compact optical module where the magnet is not detached by a slight contact with the internal wall of the lens holder.

Though the present invention is clearly described in terms of the preferred embodiments in reference to the attached drawings, a variety of modifications and alterations are obvious to those skilled in the art. It should be understood that such modifications and alterations are included in the scope of the present invention as described in the attached claims, as long as they do not deviate from this scope.

What is claimed is:

1. A fiber stub with an optical element comprising:
   a ferrule;
   an optical fiber inserted and secured to a through hole formed in the center portion of said ferrule; and
   an optical element attached to an end surface of said ferrule,
   wherein a protrusion including the through hole is integrally formed with the ferrule on its end surface, said protrusion is formed so that an outer diameter of said protrusion is less than that of the ferrule other than the protrusion, and said optical element is attached to an end surface of said protrusion, and
   wherein the ferrule and the protrusion thereon are monolithically made of a same material.

2. The fiber stub with an optical element according to claim 1, wherein the area of a cross section, perpendicular to an optical axis, of said optical element is the same as or smaller than the area of a cross section, perpendicular to an optical axis, of an end portion of said protrusion.

3. The fiber stub with an optical element according to claim 1 or 2, wherein said optical element comprises a Faraday rotator and a magnet for applying a magnetic field to said Faraday rotator.

4. The fiber stub with an optical element according to claim 3, wherein said optical element is an optical isolator or a Faraday rotator mirror.

5. The fiber stub with an optical element according to claim 3, wherein said magnet is formed in cylindrical form, said protrusion is formed in pillar form, and said magnet is engaged with said protrusion.

6. The fiber stub with an optical element according to claim 3, wherein the outer diameter of said magnet is the same as or smaller than the outer diameter of said ferrule.

7. The fiber stub with an optical element according to claim 1, wherein the end surface of said protrusion is formed to incline.

8. An optical receptacle with an optical element comprising:
   said fiber, stub with an optical element according to claim 1;
   a sleeve having openings on both ends where a plug ferrule for an optical connector is held in one opening and the rear end of said ferrule of said fiber stub is inserted into the other opening; and
   a holder having a through hole to which the front end side of said ferrule is inserted and secured.

9. The optical receptacle with an optical element according to claim 8, wherein said optical element comprises a Faraday rotator and a magnet for applying a magnetic field to said Faraday rotator, and a portion of said magnet is inserted and secured to the through hole of said holder.

10. An optical module comprising;
    an optical unit having a light emitting element; and
    said optical receptacle with an optical element according to claim 8,
    wherein light from said light emitting element enters into said optical element.

11. A manufacturing method for an optical receptacle comprising the steps of:
    forming a fiber stub with an optical element according to claim 1 by attaching said optical element to said fiber stub, and
    forming an optical receptacle by securing the front end of said fiber stub to a holder and by securing the rear end of said fiber stub to a sleeve into which an optical connector can be inserted.

12. The manufacturing method for an optical receptacle according to claim 11, wherein said optical element comprises a Faraday rotator and a magnet for applying a magnetic field to said Faraday rotator.

13. The manufacturing method for an optical receptacle according to claim 12, further comprising the step of inspecting optical properties of said fiber stub with an optical element, after forming said fiber stub with an optical element and before forming said optical receptacle.

14. The manufacturing method for an optical receptacle according to claim 13,
    wherein said optical element is an optical isolator, and, in said inspecting step, light enters into the optical element side of said fiber stub with an optical element; maximum output $P_1$ of light emitted from the rear end of said fiber stub is measured while rotating said fiber stub around an optical axis; and insertion loss is measured based on said maximum output $P_1$.

15. The manufacturing method for an optical receptacle according to claim 13, wherein said optical element is an optical isolator, and in said inspecting step, light enters into the rear end side of said fiber stub with an optical element, maximum output $P_2$ of light emitted from said optical element is measured while rotating said fiber stub with around an optical axis, and isolation is measured based on said maximum output $P_2$.

* * * * *